US012783460B2

(12) United States Patent
Gill et al.

(10) Patent No.: US 12,783,460 B2
(45) Date of Patent: Nov. 3, 2026

(54) AUTOMATED SCALABILITY AND PERFORMANCE OPTIMIZATION FOR CLOUD DATABASE SYSTEMS USING DYNAMIC POLICY MANAGEMENT

(71) Applicant: PAYPAL, INC., San Jose, CA (US)

(72) Inventors: Binay Pal Singh Gill, Roseville, CA (US); Abhijit Wasudeo Bhiwapure, Scottsdale, AZ (US)

(73) Assignee: PayPal, Inc., San Jose, CA (US)

( * ) Notice: Subject to any disclaimer, the term of this patent is extended or adjusted under 35 U.S.C. 154(b) by 30 days.

(21) Appl. No.: 18/971,966

(22) Filed: Dec. 6, 2024

(65) Prior Publication Data

US 2026/0161601 A1 Jun. 11, 2026

(51) Int. Cl.

*G06F 16/00* (2019.01)
*G06F 16/11* (2019.01)
*G06F 16/22* (2019.01)
*G06F 16/23* (2019.01)

(52) U.S. Cl.

CPC .......... *G06F 16/125* (2019.01); *G06F 16/128* (2019.01); *G06F 16/2264* (2019.01); *G06F 16/2282* (2019.01); *G06F 16/2365* (2019.01)

(58) Field of Classification Search

CPC .. G06F 16/125; G06F 16/128; G06F 16/2282; G06F 16/2264; G06F 16/2365

See application file for complete search history.

(56) References Cited

U.S. PATENT DOCUMENTS 10,552,387 B1 * 2/2020 Donohue ............ G06F 16/2365
10,613,988 B2 * 4/2020 Gattegno ............ G06F 12/0875
10,976,950 B1 * 4/2021 Trezzo .................. G06F 3/0652
12,072,868 B1 * 8/2024 Opincariu ........... G06F 16/2379
2009/0012979 A1 * 1/2009 Bateni .................... G06Q 30/02
2015/0106407 A1 * 4/2015 Adayilamuriyil ... G06F 16/2282 707/804

(Continued)

FOREIGN PATENT DOCUMENTS

EP 3 748 515 B1 * 7/2023
WO WO2023055854 A1 * 4/2023

OTHER PUBLICATIONS

Zamanian et al. Locality-aware Partitioning in Parellel Database Systems. SIGMOD'15, pp. 17-30. (Year: 2015).*

(Continued)

*Primary Examiner* — Srirama Channavajjala

(74) *Attorney, Agent, or Firm* — Greenberg Traurig, LLP

(57) ABSTRACT

A method includes accessing a retention policy and a partitioning strategy for a database. The database includes a control table and a plurality of data tables, and each data table of the plurality of data tables includes one or more data entries. The method also includes populating the control table with control entries based on the retention policy and the partitioning strategy. The populated control entries in the control table represent the plurality of data tables. At each predetermined time interval, the method also includes purging data entries from a first data table of the plurality of data tables based on a retention policy of a first control entry of the populated control entries, and generating future partitions for a second data table of the plurality of data tables based on a partitioning strategy of a second control entry of the populated control entries.

17 Claims, 6 Drawing Sheets

(56) References Cited

U.S. PATENT DOCUMENTS

| | | | | |
|---|---|---|---|---|
| 2018/0246934 | A1* | 8/2018 | Arye | G06F 16/2264 |
| 2019/0012240 | A1* | 1/2019 | Donohue | G06F 11/1471 |
| 2024/0152487 | A1* | 5/2024 | Heinz | G06F 11/3419 |

OTHER PUBLICATIONS

International Search Report and Written Opinion of application No. PCT/US2025/058284, dated Feb. 3, 2026, 12 pp.

* cited by examiner

304

| TABLE_NAME | RETENTION_PERIOD | PARTITION_FREQUENCY | FUTURE_PARTITIONS | LAST_PURGE | NEXT_PURGE | LAST_PARTITION_CHECK | NEXT_PARTITION_CHECK | MAX_STORAGE_LIMIT | RETENTION_POLICY | STATUS |
|---|---|---|---|---|---|---|---|---|---|---|
| 402 ORDERS_HISTORY | 12 | MONTHLY | 10 | 2024-09-01 | 2024-10-01 | 2024-08-15 | 2024-09-15 | 500 | GLOBAL | ACTIVE |
| 404 SALES_DATA | 6 | DAILY | 20 | 2024-09-15 | 2024-09-30 | 2024-09-01 | 2024-09-10 | 1000 | LOCAL | ACTIVE |
| 406 LOG_EVENTS | 1 | WEEKLY | 8 | 2024-09-10 | 2024-09-17 | 2024-09-05 | 2024-09-12 | 200 | GLOBAL | ACTIVE |

*FIG. 4*

AUTOMATED SCALABILITY AND PERFORMANCE OPTIMIZATION FOR CLOUD DATABASE SYSTEMS USING DYNAMIC POLICY MANAGEMENT

TECHNICAL FIELD

The present disclosure relates to database management and, more particularly, to automatically managing the size and performance of cloud database systems through dynamic policy-based maintenance, according to various embodiments.

BACKGROUND

In modern data environments, the exponential growth of information presents challenges for storage, processing, and long-term scalability. Databases, especially those containing transactional or time-sensitive information, face considerable pressure to retain only relevant data while ensuring efficient retrieval and resource utilization. Some approaches to data management, often reliant on manual intervention and routine database maintenance, become increasingly unsustainable as data scales upward. This is compounded by the limitations of both vertical and horizontal scalability, particularly in cloud-hosted environments where expanding infrastructure may be costly or restricted.

BRIEF DESCRIPTION OF THE DRAWINGS

Certain features of the subject technology are set forth in the appended claims. However, for the purpose of explanation, several embodiments of the subject technology are set forth in the following figures, where like reference numerals refer to the same or similar features in the various figures.

FIG. 4 depicts an example control table with example control entries.

DETAILED DESCRIPTION

In database environment, such as a cloud-hosted one, managing data growth and scalability presents a challenge, particularly when vertical and horizontal scaling options are limited. As data accumulates over time, tables without systematic data retention and partitioning strategies may become prone to performance degradation, high storage costs, and data retrieval inefficiencies. Manual intervention to purge outdated data and create future partitions may not only be time-intensive but also may introduce the potential for human error, creating risks for inconsistent data management. These inefficiencies may be compounded in partitioned databases where tables grow independently across multiple environments, each utilizing tailored data retention policies that align with team-specific requirements.

Some database management approaches lack an automated mechanism to enforce data retention policies dynamically and manage partition growth proactively. Without such automation, database maintenance demands may grow exponentially, making long-term scalability unfeasible. Inconsistent purging schedules, excessive storage consumption, and unmanaged partition growth may lead to bloated tables and unoptimized queries, which in turn may increase resource costs and hinder database performance.

The subject technology of the present disclosure includes an automated, policy-driven database management solution that reduces the need for manual data retention and partition management, while helping each table adhere to predefined retention policies tailored to its environment. The subject technology aims to proactively handle data purging, limit uncontrolled data growth, and manage future partition creation without human intervention. By establishing a scalable system, the subject technology may reduce storage costs, improve query performance, and provide an efficient, autonomous solution that supports long-term database stability and compliance with retention policies.

Figure 1:
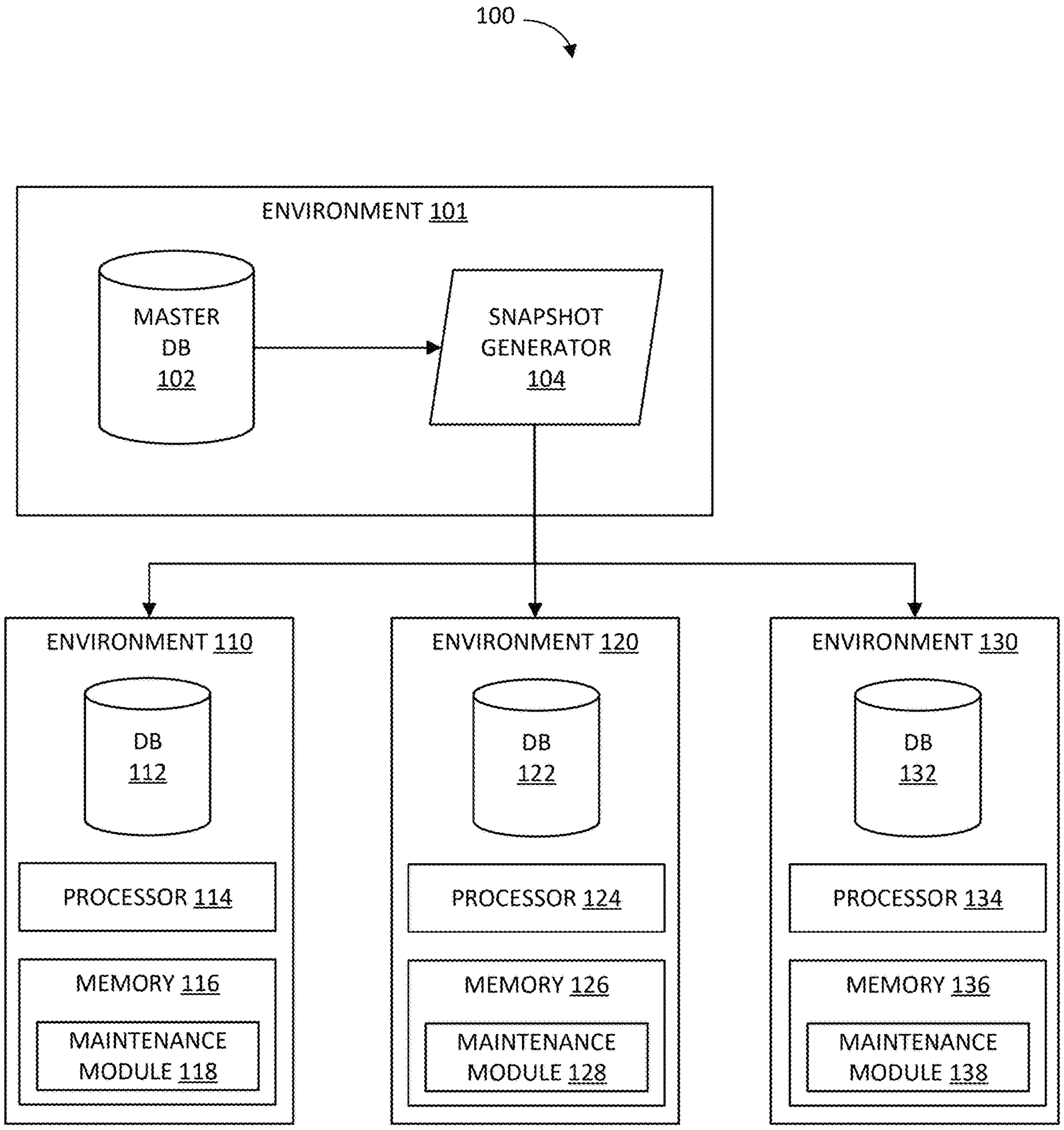
FIG. 1 depicts a diagram of an example distributed database system.

Referring now to the drawings, FIG. 1 is a diagram of an example distributed database system. Not all of the depicted components may be used in all embodiments, and one or more embodiments may include additional, fewer, or different components than those shown in the figure. Variations in the arrangement and type of components may be made without departing from the spirit or scope of the claims as set forth herein.

The distributed database system may be a computing system 100, hosting one or more environments 101, 110, 120, 130, each of which may be tailored to a particular use case. The system 100 may be implemented as a system 600 (or as a set of systems 600) described below. A central environment 101 may be a system of record that includes a master database 102, which may be the source of ground truth for the data in the system 100. The data in the master database 102 may be stored indefinitely or for some extended period of time (e.g., one or more decades). The central environment 101 may also include a snapshot generator 104, which may create snapshots of the data from the master database 102. The snapshots can be used to seed the databases of other environments with data from the master database 102. Seeding the databases of the other environments with the snapshots from the snapshot generator 104 may be a one-time process.

Other environments managed by the central environment 101 may include, for example, a staging environment 110, a testing environment 120, and a geographically distributed environment 130. Each of the managed environments 110, 120, 130 may run on its own physical and/or virtual devices (e.g., servers) and include its own physical and/or virtual computation resources (e.g., processors 114, 124, 134 and memory 116, 126, 136), which may be implemented as a system 600 (or as a set of systems 600) described below. The central environment 101 and the managed environments 110, 120, 130 may all be hosted on the computing system 100 and include their own resources (e.g., virtual processor and virtual memory). Although four environments are shown, it should be understood that more or fewer than four environments may be utilized in the system 100 and that the central environment 101 may create and/or manage more or fewer than three managed environments.

The managed environments 110, 120, 130 may include their own databases 112, 122, 132, which may be relational databases. Relational databases may benefit from well-defined data schemas and partitioning mechanisms that can be applied to tables based on temporal data (e.g., monthly or daily partitions), which may be suitable for automated retention policies, periodic purging, and managed partition growth. Additionally, relational structures enable straightforward addition or removal of partitions so that data retention policies may be maintained without compromising data consistency or integrity.

The managed environments 110, 120, 130 may serve distinct purposes aligned with the use cases and data flows of various developer teams and operational requirements. The managed environments 110, 120, 130 may represent isolated database instances, which, while initially seeded with the same snapshot of master data, may evolve independently as the data in each managed environment 110, 120, 130 grows and changes based on specific workflows, testing, or regional regulations. The division into separate managed environments can address different functional or project-based needs. For instance, one environment 110 may be dedicated to feature development and testing, while another environment 120 may focus on localization or region-specific data management, and a third environment 130 may handle performance testing or scalability analysis. This separation of managed environments enables specialized development work in controlled spaces, enabling each team to work without impacting other teams. The managed environments 110, 120, 130 may serve as testing grounds, so that any changes or new features may be validated before potential deployment to a production-ready environment.

As the managed environments 110, 120, 130 are utilized over a span of time (e.g., one year), their respective databases 112, 122, 132 may each experience data growth, leading to increasingly large and cumbersome databases. This is particularly the case when the databases are limited in their vertical scalability (e.g., growth within the resources of a particular device) and horizontal scalability (e.g., growth across devices, such as within a cluster). The data growth may be independent across environments, making it challenging to manage. One approach for database management includes a manual process repeated at regular intervals (e.g., annual) where new parallel managed environments are created with minimal seed data (e.g., from the master database 102), data flows and pipelines are redirected to the new managed environments, and the old, bloated managed environments are destroyed. Such an approach may be resource intensive, cause service disruptions during the transition, and have a potential for data loss or inconsistencies.

An improved approach for database management, as disclosed herein, includes a policy management system that dynamically maintains databases 112, 122, 132 in managed environments 110, 120, 130, enabling automated scalability and performance optimization. In addition to seeding the databases 112, 122, 132 of the managed environments 110, 120, 130, the snapshot generator 104 may also include one or more automation packages for applying one or more management policies to the databases 112, 122, 132 of the management environments 110, 120, 130. Each automation package may be or may include one or more (e.g., a set of) scripts and/or configurations that implement data management policies for database objects within a managed environment.

The automation packages may be flexible, enabling global and local retention policies to be defined. A global management policy may apply to all database objects across a managed environment, and a local management policy may be specific to a particular user group or dataset in a managed environment. For example, a global management policy may define a maximum age of 365 days, and the environment 110 (e.g., by maintenance module 118) may enforce the global management policy by purging data that is older than the maximum age, which may apply to all database objects across the environment 110. As another example, a local management policy may define a different maximum age of 180 days for customer data, and the environment 110 (e.g., by maintenance module 118) may enforce the local management policy by purging customer data that is older than the maximum age for customer data, which may only apply to the sales team's specific dataset in the environment 110.

A managed database 112, 122, 132 may include its own data tables. Data tables may store large amounts of data for efficient storage and retrieval. Data tables may have a simple, flat structure, with rows and columns that represent individual data points. Partitions may be subdivisions of a data table that organize large datasets into smaller, more manageable segments based on specific criteria, such as time intervals (e.g., daily, monthly) or data ranges (e.g., geographic regions). In a relational database, a single data table can hold a vast amount of information, which may become unwieldy to query, update, or maintain as it grows. By partitioning the table, each partition can be treated as a smaller, distinct segment, optimizing data retrieval and processing. New partitions may be added to accommodate future data, so that the database 112, 122, 132 can continue to handle new entries in an organized manner. In a time-based partitioning strategy, for example, creating future partitions in advance prevents data from overflowing into a single partition, which may degrade performance and complicate data management. Proactive partition strategies may help avoid issues where data intended for a new timeframe accumulates in the latest available partition, which can slow down query performance and complicate purging strategies. Partitioning strategies may also reduce the complexity of managing large datasets, as each partition can be archived or deleted independently without impacting other segments of the data table, thereby maintaining system agility and efficiency.

A managed database 112, 122, 132 may also include its own control table. A control table may be a type of database table that stores metadata or control information about its corresponding database, rather than substantive data. Unlike data tables in a database, which may store the primary substantive data of interest, control tables may contain information that is used to manage, configure, and/or govern the corresponding database. Control tables may also have a more complex structure than data tables, with relationships between different tables and columns that define the database's behavior.

The control tables of each environment 110, 120, 130 may store and manage data management policies (e.g., retention policies and partitioning strategies) that are received as automation packages from the central environment 101. A control table may include the configuration settings and rules that govern, for example, data retention period, data purging schedules, partitioning strategies, and archiving settings for the associated database. Maintenance modules 118, 128, 138 may receive automation packages and store the automation packages in memory 116, 126, 136. The maintenance modules 118, 128, 138 may use the automation packages to populate their respective control tables with one or more control entries including configuration settings and rules, which may then be used by the maintenance modules 118, 128, 138 (via one or more scripts stored in memory 116, 126, 136) to enforce data retention policies in their respective database 112, 122, 132. By using a control table to manage retention policies, the environments 110, 120, 130 may automatically manage their respective stored data, improving the performance and integrity of their respective database 112, 122, 132.

In operation, the environment 101 may include a master database 102. The snapshot generator 104 may periodically generate snapshots of the master database 102. A proprietor of the database 102 may add a second database 112, in a managed environment 110, for the purpose of providing a controlled environment with relevant data, enabling a development team to work in the controlled environment without impacting the other development teams. The proprietor may also define a global data management policy and a local data management policy specific to the second database 112. The snapshot generator 104 may transmit the most recent snapshot of the master database 102 to the second database 112, along with the global data management policy and the local data management policy specific to the second database 112. The second database 112 may seed itself with the data from the received snapshot and may populate a control table with the parameters of the received global and local data management policies. Going forward, the second database 112 may apply the global and local data management policies automatically and independent of the master database 102 and independent of other databases 122, 132. For example, the second database 112 may automatically purge (e.g., delete or consolidate) data stored in the second database 112 according to the global and local data management policies reflected in the control table of the second database 112.

Figure 2:
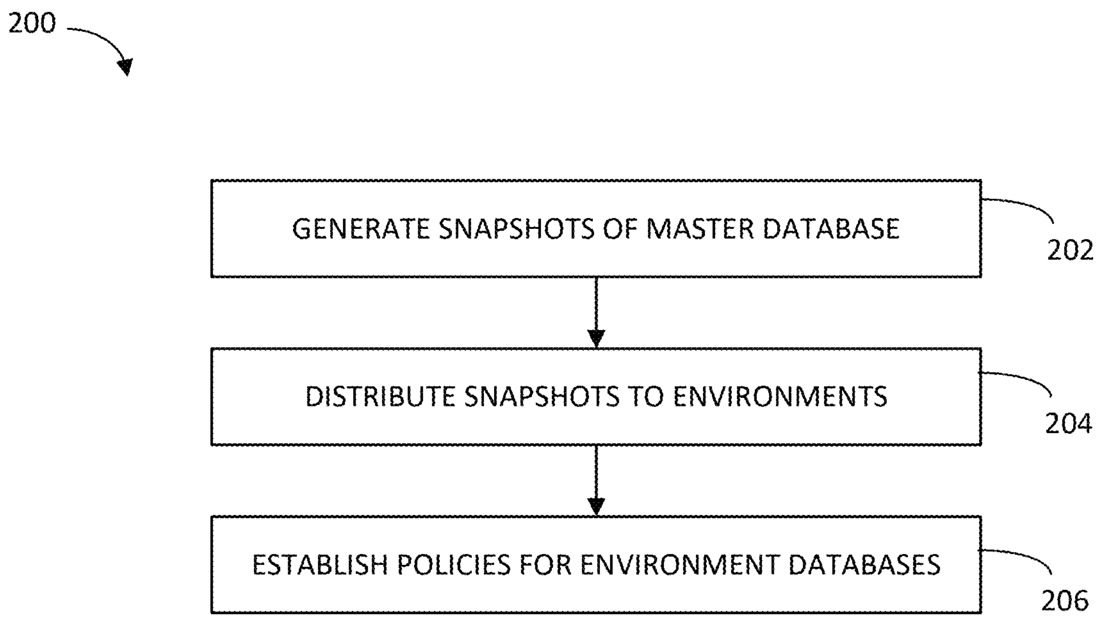
FIG. 2 depicts a flow chart of an example process for establishing a distributed database system.

FIG. 2 is a flow chart depicting an example process 200 for establishing the distributed database system. For explanatory purposes, FIG. 2 is described herein with reference to the system 100 of FIG. 1. However, this is merely illustrative, and features of the system 100 may be performed by any other system for implementing the subject technology. Additionally, for explanatory purposes, the operations of the process 200 are described herein as occurring sequentially or linearly. However, multiple operations of the process 200 may occur in parallel. The operations of the process 200 need not be performed in the order shown, and one or more operations of the process 200 need not be performed or can be replaced by other operations.

At operation 202, a snapshot generator 104 may generate snapshots of the master database 102 in the central environment 101. The snapshot generator 104 may create periodic snapshots of the master database 102 in the central environment 101. The snapshots may be respective point-in-time copies of at least some of the master database 102, capturing the state of the data at a particular moment. The snapshot generator 104 may create the snapshots at regular intervals, such as daily, weekly, or monthly, depending on the requirements of the system 100. The snapshot generator 104 may also perform additional tasks, such as compressing or encrypting the snapshots to reduce storage costs and improve data security. The snapshots generated by the snapshot generator 104 may enable the creation of new managed environments, such as staging or testing environments, by providing (e.g., seeding) the database of the managed environment with a copy of at least part of the master database 102. For example, the managed environment may use the snapshot to create data entries in data tables of the database, which is discussed below with respect to FIG. 3.

Additionally, in the context of the automation packages, the snapshot generator 104 may provide global and/or local data management policies to managed environments (e.g., when the database of the new managed environment is seeded) as part of or along with the snapshot. In some embodiments, the environment 101 may be associated with a web-based interface or application programming interface (API) through which the snapshot generator 104 may receive data management policies, and/or aspects of data management policies, from administrators or other users. In some embodiments, the global and local policies may be defined in configuration files (e.g., JSON, XML, and/or YAML) that are stored in a centralized location (e.g., in the environment 101), which may be accessible to the snapshot generator 104. In some embodiments, the environment 101 may include a database to store global and local policies, which the snapshot generator 104 can query to retrieve the policies and push them to a managed environment as part of the snapshot. In some embodiments, the snapshot generator 104 may receive a configuration file from a user. In some embodiments, the snapshot generator 104 may generate a configuration file based on input from a user. In some embodiments, the snapshot generator 104 may retrieve the policies and push them to a managed environment along with the snapshot. For example, the managed environment may use the data management policies to create control entries in a control table of the database, which is discussed below with respect to FIG. 3.

At operation 204, the snapshot generator 104 may distribute snapshot and data management policies (e.g., global and/or local) to the managed databases (e.g., databases 112, 122, 132). The snapshot generator 104 may utilize data replication and/or data synchronization techniques to distribute the snapshots and/or policies to the managed databases. Data replication and synchronization may involve using database-specific replication mechanisms, such as Oracle GoldenGate or MySQL replication, or tools, such as Apache Kafka or AWS Database Migration Service. The snapshot generator 104 may transmit the data securely and efficiently, using techniques such as compression, encryption, and parallel processing.

At operation 206, the data tables and control table in a database of the managed environment may be populated with entries based on the snapshot and data management policies, respectively, from the snapshot generator 104.

When the snapshot generator 104 provides (e.g., distributes, sends, moves, etc.) the snapshot to the managed environment (e.g., environment 110), the snapshot may be used to populate the database (e.g., database 112) with data entries, creating a copy of the data from the master database 102. By populating the managed database with data entries, the snapshot provides a foundation for the managed environment to operate on, enabling corresponding teams to test, develop, and analyze data without affecting the master data. For example, when a snapshot is received by the managed environment, the snapshot may be used to generate one or more data tables and generate one or more data entries for each of the data tables. The data entries may then include data from the snapshot. When the data tables are generated, control entries corresponding to the data tables may also be generated at the control table.

Additionally, the data management policies (e.g., global and/or local) distributed by the snapshot generator 104 may be used to populate the control table of the database (e.g., database 112) with control entries, which govern certain behaviors of the database. For example, the database may store the parameters of one or more data management policies received from the snapshot generator 104 as control entries in the control table. As a result, the control entries may dictate how data is managed, accessed, and retained within the database. Via the data management policies translated by the maintenance module into control table entries, the snapshot generator may provide a set of rules that help the managed database operate consistently and in accordance with organizational requirements.

Figure 3:
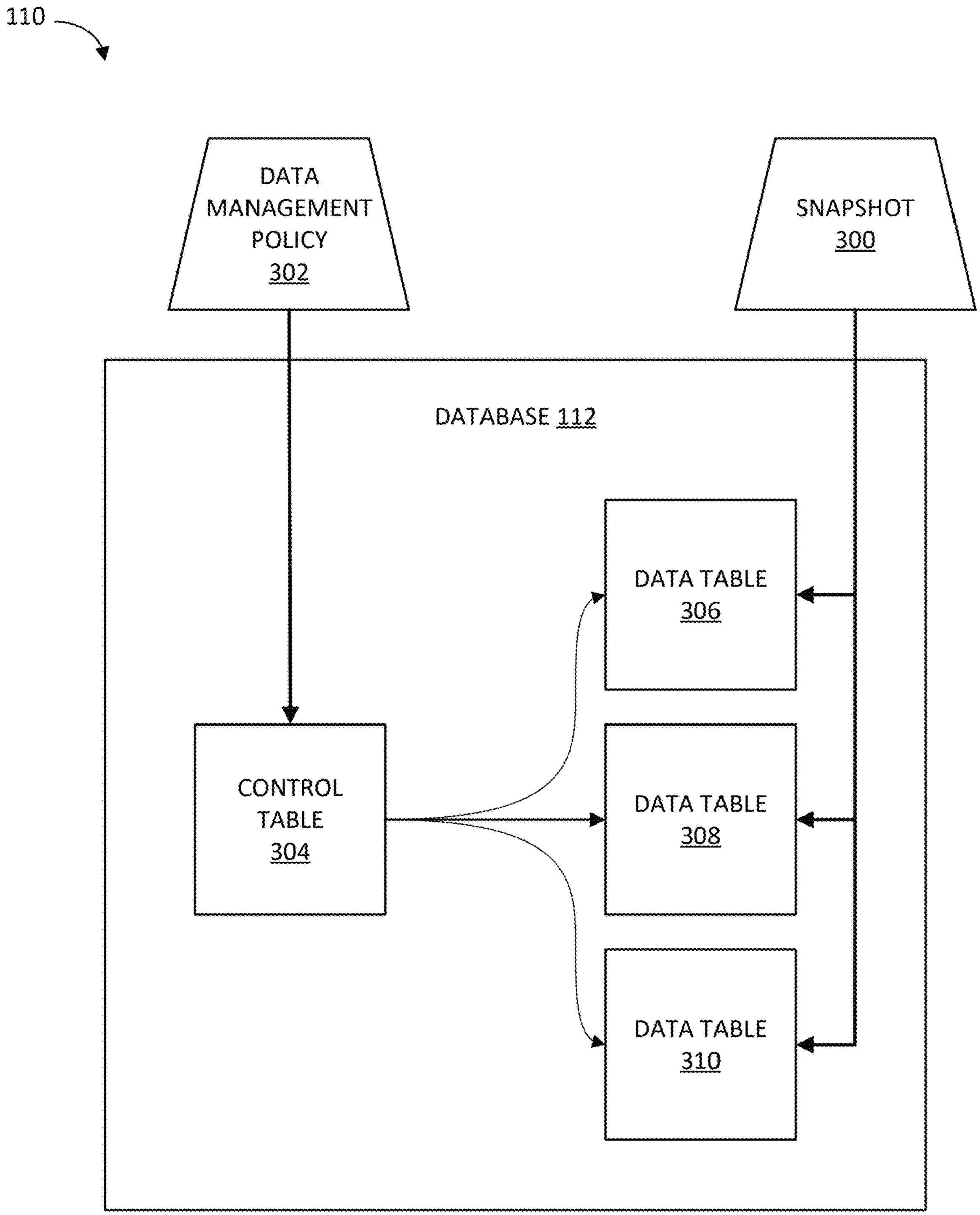
FIG. 3 depicts a diagram of populating a control table of a database.

FIG. 3 is a diagrammatic view of a process for populating a control table 304 of a database 112. For explanatory purposes, FIG. 3 is described herein with reference to the system 100 of FIG. 1, and thus the process 500 may be computer-implemented. However, this is merely illustrative, and features of the system 100 may be performed by any other system for implementing the subject technology. Not all of the depicted components may be used in all embodiments, and one or more embodiments may include additional, fewer, or different components than those shown in the figure. Variations in the arrangement and type of components may be made without departing from the spirit or scope of the claims as set forth herein.

The managed environment 110 may include a database 112, which may be a relational database, NoSQL database, cloud-native database, and/or the like. The database 112 may include one or more data tables 306, 308, 310. Each data table 306, 308, 310 may include a set of rows and columns where each row may represent a single data entry and each column may represent a field or attribute of that data entry. Each data table 306, 308, 310 may be logically divided into one or more segments, or partitions, based on certain criteria (e.g., date ranges, list values, or hash values).

The environment 110 may receive data 300 for the database 112. The data 300 may be a snapshot from the snapshot generator 104 (e.g., to seed the database 112) and/or information from an application pipeline or other source in the environment 110 (e.g., after the database 112 has been seeded). When the data 300 is received by the environment 110 (e.g., from the snapshot generator 104), the data tables 306, 308, 310 may be populated with data entries according to the data 300. For example, the maintenance module 118 may transfer (e.g., copy, move, send, etc.) the data 300 to the data tables 306, 308, 310, as appropriate. In some embodiments, the data tables 306, 308, 310 may be created as needed according to the data 300. In some embodiments, the data tables 306, 308, 310 may be dropped as needed according to the data 300. This way, the database 112 may have one or more tables, each with one or more data entries, representing at least a subset of the master database 102.

The environment 110 may also receive the data management policy 302 (e.g., from the snapshot generator 104 as part of or along with the data 300). When the data management policy 302 is received, the control table 304 may be populated with control entries according to the data management policy 302. For example, the maintenance module 118 may generate one or more control entries for each of the data tables 306, 308, 310 and transfer policies (e.g., global and local) from the data management policy 302 to the control entries. This way, the maintenance module 118 of the environment 110 has a set of standards by which it may automatically manage each data table 306, 308, 310 of the database 112.

FIG. 4 is a diagrammatic view of an example control table 304 with example control entries 402, 404, 406. Each control entry 402, 404, 406 of the control table 304 may be associated with a data table (e.g., data tables 306, 308, 310). FIG. 4 is described herein with reference to the system 100 of FIG. 1. However, this is merely illustrative, and features of the system 100 may be performed by any other system for implementing the subject technology. Not all of the depicted components may be used in all embodiments, and one or more embodiments may include additional, fewer, or different components than those shown in the figure. Variations in the arrangement and type of components may be made without departing from the spirit or scope of the claims as set forth herein.

The control table 304 may be created when the corresponding database (e.g., database 112) is created. The control table 304 may be populated with the control entries 402, 404, 406 according to a data management policy (e.g., data management policy 302). For example, when a managed environment 110 is created by the central environment 101, the central environment 101 may provide the managed environment 110 with a data management policy and a snapshot, and the managed environment 110 may initialize its database 112 by populating the database 112 with data entries based on the snapshot and may initialize a control table of the database 112 with control entries 402, 404, 406 based on the data management policy.

Each attribute of a control entry 402, 404, 406 may represent metadata and control information about the data table corresponding to the entry.

Metadata of a data table may include attributes such as table name, data format, partitioning scheme, and/or data encryption. "Table name" may describe the name (or other identifier) of the data table corresponding to the control entry. For example, the control table 304 may include three entries representing an "ORDERS_HISTORY" data table, a "SALES_DATA" data table, and a "LOG_EVENTS" data table. "Data format" may describe the format of the data (e.g., CSV, JSON, XML) in the data table corresponding to the control entry. "Partitioning scheme" may describe how the data table corresponding to the control entry is partitioned (e.g., range-based, list-based, hash-based). "Data encryption" may describe whether data in the data table is encrypted and how it was encrypted. In some embodiments, metadata to be stored in control entries may be obtained from the data 300 (e.g., after the data tables 306, 308, 310 are populated with data entries).

Control information may include attributes such as retention period, partition frequency, future partitions, last purge, next purge, last partition check, next partition check, maximum storage limit, retention policy, and status. "Retention period" may describe the length of time that data should be retained in the corresponding data table before the data is purged or archived. For example, the control entries 402, 404, 406 specify respective periods of months (12 months, 6 months, and 1 month, respectively). "Partition frequency" may describe how often the corresponding data table is divided into new partitions. For example, a partition frequency may be daily, weekly, monthly, etc. "Future partitions" may describe whether or how many future partitions should be or can be automatically created for the corresponding data table. For example, a future partitions value may be a Boolean value, a number of future partitions to create, a minimum threshold number of partitions that should be available before creating a predetermined number of partitions, etc. "Last purge" may be a record of when data was last removed from the corresponding data table. For example, a last purge entry may be a date and/or time of the last purge operation performed on the corresponding data table. "Next purge" may be a record of when the data is scheduled to be evaluated for purging from the corresponding data table. For example, a next purge entry may be a date and/or time of the next purge operation to be performed on the corresponding data table. "Last partition check" may be a record of when the partitioning scheme of the corresponding data table was most recently checked and updated. For example, a last partition check value may be a date and/or time that the last partition check operation was performed on the corresponding data table according to a partitioning strategy specified by the partition frequency and future partitions attributes. "Next partition check" may be a record of when the partitioning scheme is scheduled to be checked and updated again. For example, next partition check may be a date and/or time that the next partition check operation is scheduled to be performed on the corresponding data table. "Max storage limit" may define a maximum amount of storage space that is allocated to the corresponding data table. The max storage limit attribute may be a threshold for the maximum size of the data table before data is to be purged or archived as part of a data retention policy. "Retention policy" may determine the scope of the retention policy defined by the control entry. For example, the retention policy may indicate that the retention policy for the corresponding data table is global (e.g., applies to all tables) or local (e.g., applies only to this table). Status may indicate whether the corresponding data table and/or the control entry is currently active (e.g., being used) or inactive (e.g., not being used).

Figure 5:
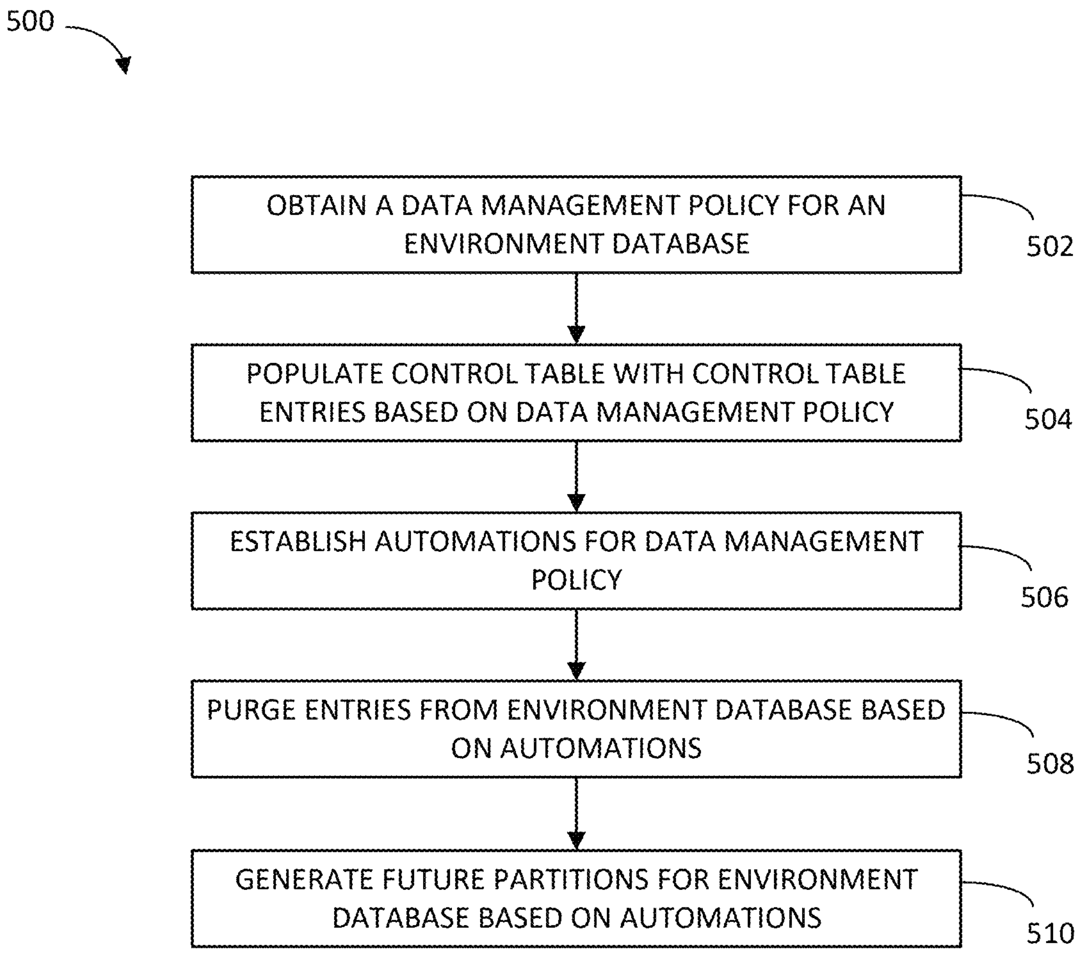
FIG. 5 depicts a flow chart of an example process for automated database management.

FIG. 5 is a flow chart depicting an example process 500 for automated database management. For explanatory purposes, FIG. 5 is described herein with reference to the system 100 of FIG. 1, and thus the process 500 may be computer-implemented. However, this is merely illustrative, and features of the system 100 may be performed by any other system for implementing the subject technology. Additionally, for explanatory purposes, the operations of the process 500 are described herein as occurring sequentially or linearly. However, multiple operations of the process 500 may occur in parallel. The operations of the process 500 need not be performed in the order shown, and one or more operations of the process 500 need not be performed or can be replaced by other operations.

At operation 502, a managed environment (e.g., environment 110) may obtain (e.g., access, receive, retrieve, etc.) one or more data management policies (e.g., data management policy 302) for a database (e.g., database 112). The data management policy may be obtained via one or more automation packages (e.g., from a snapshot generator 104) and may include a retention policy and a partitioning strategy.

A retention policy may define age limits and/or size limits for data retention. Specifically, retention policy may specify a maximum duration for retaining data, based on either a specific date or a threshold age (e.g., 30 days, 1 year, or 5 years). The retention policy may also include actions to be taken once data reaches the defined age limit, such as purging, archiving, offloading, deleting, and/or migrating the data. Additionally, a retention policy may include a size limit, specifying a maximum amount of data that can be retained. When data exceeds the size threshold, the retention policy may specify actions to manage the excess, such as purging, archiving, deleting, migrating, and/or compressing the data.

A partitioning strategy may define an approach for dividing a dataset into smaller pieces, which can reduce the amount of data to be processed, improve data retrieval times, enable parallel processing and query optimization, and simplify data management and maintenance tasks. Data may be partitioned based on a specific range of values (e.g., date ranges, numeric ranges), a list of specific values (e.g., country codes, product categories), a hash function applied to a column (e.g., user ID, record ID), and/or the like. Partitioning strategies may also specify the creation of future partitions, which may prepare a data table for future data growth and maintain optimal data organization and performance.

For example, a managed database may be an e-commerce database that logs daily sales records. To manage the daily sales records, the database may be partitioned by month, with each month's sales records stored in a separate partition. To keep the database efficient and avoid performance degradation, future partitions may be created for upcoming months before data begins filling those timeframes. This proactive approach helps new transactions for the next month flow seamlessly into a pre-existing future partition, preventing data from accumulating a particular partition and overloading that partition.

The decision to create future partitions may be made by a maintenance module (e.g., maintenance module 118) that monitors partition growth and data usage. The maintenance module may use the partitioning strategy defined in the control table. The partitioning strategy may specify parameters, such as how far in advance to create partitions (e.g., add 3 months of partitions at a time) and triggers for adding new partitions (e.g., when only one future partition remains unfilled). Once the maintenance module determines that new partitions are needed, the maintenance module may communicate this decision to the database (e.g., database 112) via an automation package (e.g., script), which executes commands to create the specified number of partitions for future periods. The commands may be part of an automated job scheduled within the database, allowing the database to dynamically respond to partition needs without manual intervention. The database may then apply the partitioning strategy to create the new partitions in its data tables according to the criteria specified in its control entries corresponding to the data tables.

At operation 504, the managed environment may populate the control table (e.g., by directly populating the control table, by causing another system to directly populate the control table, etc.) with control entries based on the data management policy (e.g., the retention policy and the partitioning strategy). For example, the maintenance module 118 may have a data management policy stored in memory 116. When the database 112 is initialized, a respective control entry 402, 404, 406 may be created in the control table for each data table 306, 308, 310. The maintenance module 118 may populate a control table of the database 112 by inputting metadata and data management policy details from the data management policy 302 into the relevant control entries 402, 404, 406, which facilitates the automated database management activities for the data tables corresponding to the control entries.

A control entry of the populated control table may correspond to a data table (e.g., data table 306) of the database (e.g., database 112) of the managed environment. The management module of the managed environment may reference the control entry for maintaining the data table, for example, to prevent the data table from exceeding the vertical/horizontal scalability limits of its host device (e.g., the system 100). In some embodiments, the database of the managed environment may reference the control entry for maintaining the data table.

For example, the control entries may include a retention threshold defining a threshold data age and/or size and what happens to data that has grown too old and/or too large. For example, the maintenance module may read the control entry 402, which specifies an age limit of 12 months, and the maintenance module may periodically direct the database to purge data from the corresponding data table that is older than 12 months. The control entries may include a future partition threshold, indicating a minimum number of future partitions a data table should have at a point in time or size of the data table. For example, the maintenance module may read the control entry 402, which specifies that a corresponding data table should have at least 10 future partitions, and the maintenance module may direct the database to create a number (e.g., a predetermined number or a difference between the current number of future partitions and a threshold number of future partitions) of future partitions when the corresponding data table has less than 10 future partitions.

The data management policy may include global policies that may represent a default policy. The global policies may apply to all data entries of a data table and/or all data tables of a database. The data management policy may also include local policies that may represent specific cases or exceptions to the default policy. The local policies may apply to particular data entries of a data table and/or particular data tables of the database. The local policies may be provided in the same data management policy as the global policies. In some embodiments, the local policies may be provided in a different data management policy as the global policies.

For example, a control table may first be populated with control entries corresponding to the data tables of the database. A first data management policy may be received from the central environment and used to update the control entries (e.g., one or more attributes of one or more control entries) with a global policy. A second data management policy may be received from the central environment and used to update the control entries (e.g., one or more attributes of one or more control entries) with a local policy. If a local policy conflicts with a global policy for a control entry and the control entry has an attribute for each policy, the local policy in the control entry may be prioritized over the global policy. If a local policy conflicts with a global policy for a control entry and the control entry has only a single attribute for each policy, the conflicting attribute may be updated to the local policy, overwriting the global policy.

At operation 506, one or more automations may be established for enforcing the data management policies. A maintenance module (e.g., maintenance module 118) on a managed environment (e.g., environment 110) of the computing system may establish (e.g., create, build, etc.) automations such as scheduled tasks (e.g., tasks that automatically execute at predetermined time intervals), event-driven triggers (e.g., tasks that automatically execute in response to predetermined events, such as deployment of an updated data management policy), data-driven triggers (e.g., tasks that automatically execute in response to changes in data, such as surpassing a data age and/or data size threshold), and/or the like, for one or more data tables of the database (e.g., database 112) based on the data management policies specified in the control entries corresponding to the data tables. The automations may be in the form of Cron jobs or other scripting tools (e.g., in Python or PowerShell).

At operation 508, data entries may be purged (e.g., deleted, archived, migrated, truncated, etc.) from a data table by the maintenance module based on a retention policy of a control entry corresponding to the data table. The purging process may be governed by the control entries in the control table, which define the retention policies for each data table. The maintenance module may read the control entries periodically and/or in response to predetermined triggers, checking each table against their corresponding control entry. If the data in any data table exceeds the defined limits of the corresponding control entry, the maintenance module may initiate a purge operation (e.g., via an automation package to the database) based on the action specified in the corresponding control entry, such as deleting, archiving, or migrating data. The prompts for the maintenance module to check control entries may come from scheduled tasks, where the maintenance module periodically checks each control entry (e.g., daily, weekly, monthly, etc.) to enforce policies consistently. Event-driven and/or data-driven triggers may also prompt the maintenance module to check control entries. For example, an event like the completion of a database backup might trigger the maintenance module to check for data that is now eligible for purging. A data-driven trigger might trigger the maintenance module if the size of a specific table reaches its storage threshold, signaling the need for immediate action to avoid exceeding capacity.

For example, at the end of each day, the maintenance module may check a control entry 402. If the current date is or has passed the date in the NEXT_PURGE attribute, the maintenance module may evaluate the data retention attributes, such as RETENTION_PERIOD and MAX_STORAGE_LIMIT. The maintenance module may determine that the data table corresponding to the control entry 402 includes data that is at least 12 months old and/or at least 500 gigabytes, and, in response to the determination, purge (e.g., remove or archive) the offending data from the data table. If the data table is partitioned by date, the maintenance module may purge entire partitions that exceed the age limit of the retention policy, enabling bulk purging. If the data table has grown beyond its permitted size, the maintenance module may purge individual data entries based on their respective timestamps, starting with the oldest entries and continuing until the data table is back within allowable limits.

At operation 510, future partitions may be generated for a data table by the maintenance module based on the partitioning strategy of a control entry corresponding to the data table. The future partition generation process may be governed by the control entries in the control table, which define the partitioning strategies for each data table. The maintenance module may read the control entries periodically and/or in response to predetermined triggers, checking each table against their corresponding control entry. If the number of partitions of any data table falls short of the defined minimums of the corresponding control entry or spike in data growth is observed in the current partitions, for example, the maintenance module may initiate the creation of additional future partitions (e.g., via an automation package to the database) based on the corresponding control entry. The prompts for the maintenance module to check control entries may come from scheduled tasks, where the maintenance module periodically checks each control entry (e.g., daily, weekly, monthly, etc.) to enforce policies consistently. Event-driven triggers (e.g., the performance of a backup) and/or data-driven triggers (e.g., a spike in data growth) may also prompt the maintenance module to check control entries.

For example, at the end of each day, the maintenance module may check a control entry 402. If the current date is or has passed the date in the NEXT_PARTITION_CHECK attribute, the maintenance module may evaluate the partitioning attributes, such as FUTURE_PARTITIONS and PARTITION_FREQUENCY. If the data table corresponding to the control entry 402 includes fewer than 10 future partitions (the threshold set by FUTURE_PARTITIONS) and/or it has been a month since the last partition check, the maintenance module may calculate the number of new partitions needed based on the current count and the target of 10 future partitions (e.g., if 10 future partitions are required and only 3 exist, 7 partitions may be generated). The maintenance module may then dynamically generate and send database commands to the database to cause the database to create the new partitions. The future partitions may be generated but remain empty initially, ready to accept future data. As new data flows into the data table, the new data may automatically fill the newly created partitions so that data storage remains organized and efficient. Having future partitions in place allows the database to seamlessly handle growth without requiring real-time partition creation, which could lead to performance delays. After the future partitions are generated, the maintenance module may update the NEXT_PARTITION_CHECK attribute to a date based on the PARTITION_FREQUENCY attribute.

The process 500 automates data management, improving efficiency and storage control compared. In a financial transactions database, for example, suppose each month generates around 1 terabyte of new data. Without automated retention, each year, database administrators would manually clone each managed environment and seed each database with data from the master database and select data from the old database, often leading to delays and high risk of data loss. Once each managed environment is cloned and its respective database is seeded, the old managed environments, with their bloated databases, may be destroyed. With retention policies in place, however, the maintenance module can automatically identify and delete data that exceeds the one-year threshold, purging the oldest 1 terabyte of data every month without human intervention. This automation may keep the storage consistently within capacity limits, reduces the risk of error, and keeps the database responsive, handling high transaction volumes efficiently.

Partition management, coupled with retention policies, further enhances database performance and scalability. Suppose the database is partitioned monthly and set to maintain 10 future monthly partitions to handle high data inflow. Instead of database administrators manually checking for available partitions and manually create new future partitions each month, the maintenance module may proactively create future partitions months in advance. Partition management helps each new month's data flow seamlessly into an existing future partition, preventing performance lags that can occur when partitions become overloaded. By automating both retention and partition management, the managed environment may stay within horizontal and vertical scaling limitations imposed by cloud infrastructure providers, effectively supporting data growth and reducing costs associated with storage infrastructure.

Figure 6:
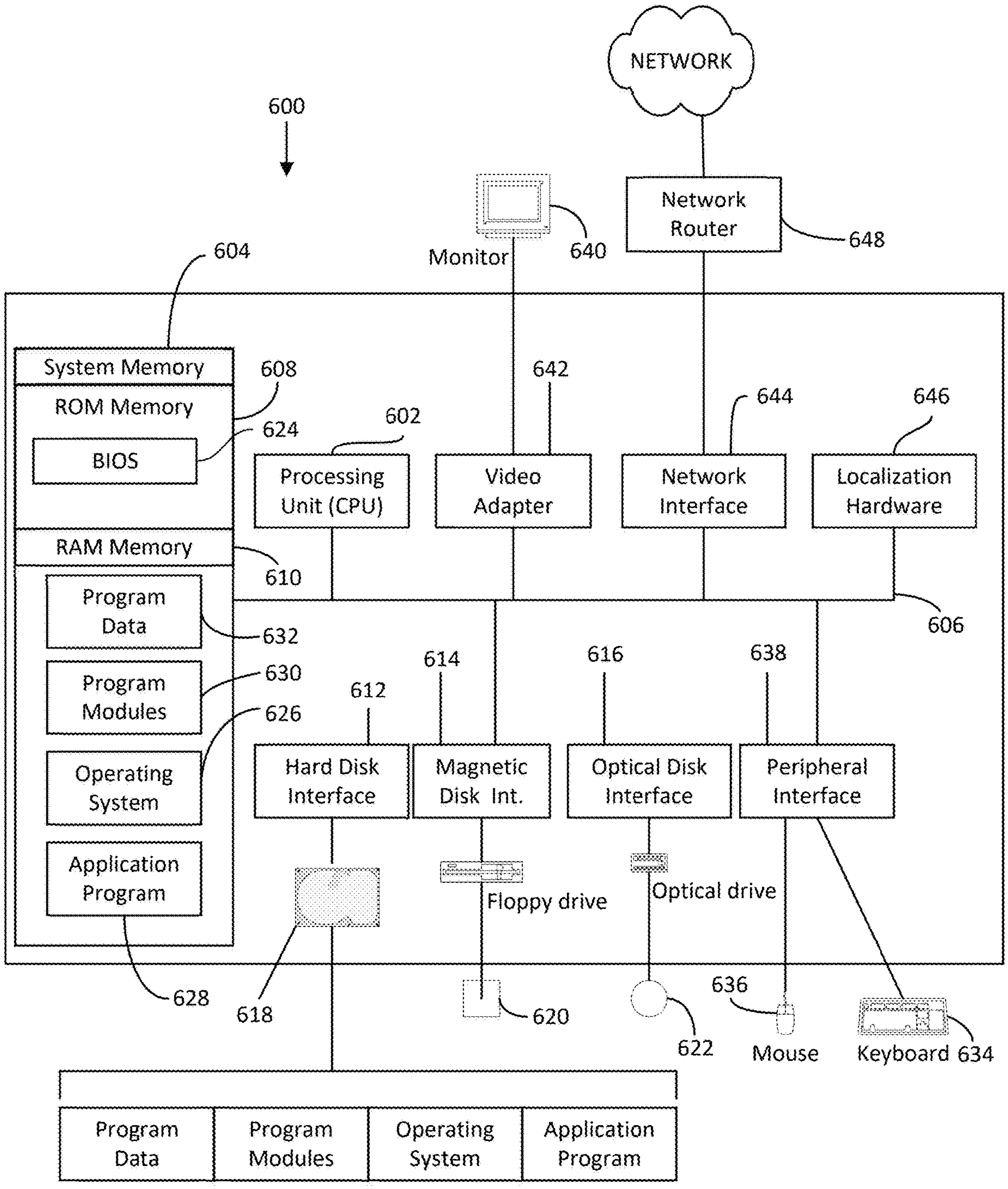
FIG. 6 depicts a block diagram of an example computing system.

FIG. 6 is a block diagram depicting an example computing system 600. A computing system 600 may be an electronic device (e.g., desktop computer, laptop, smartphone, tablet, etc.) having the ability to execute instructions, such as those stored within a non-transitory computer-readable medium. Furthermore, while described and illustrated in the context of a single computing system 600, those skilled in the art will also appreciate that the various tasks described hereinafter may be practiced in a distributed environment having multiple computing systems 600 linked via a network (e.g., local area network or wide area network) in which the executable instructions may be associated with and/or executed by one or more of multiple computing systems 600.

In its most basic configuration, the computing system 600 may include at least one processing unit 602 and at least one memory 604, which may be linked via a bus 606. Depending on the exact configuration and type of computing system environment, memory 604 may be volatile (such as RAM 610), non-volatile (such as ROM 608, flash memory, etc.) or some combination of the two.

Computing system 600 may have additional features and/or functionality. For example, computing system 600 may also include additional storage (removable and/or non-removable) including, but not limited to, magnetic or optical disks, tape drives and/or flash drives. Such additional memory devices may be made accessible to the computing system 600 by means of, for example, a hard disk drive interface 612, a magnetic disk drive interface 614, and/or an optical disk drive interface 616. As will be understood, these devices, which would be linked to the system bus 606, respectively, allow for reading from and writing to a hard drive 618, reading from or writing to a removable magnetic disk 620, and/or for reading from or writing to a removable optical disk 622, such as a CD/DVD ROM or other optical media. The drive interfaces and their associated computer-readable media allow for the non-volatile storage of computer-readable instructions, data structures, program modules and other data for the computing system 600. Those skilled in the art will further appreciate that other types of computer-readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer-readable instructions, data structures, program modules or other data. Any such computer storage media may be part of computing system 600.

A number of program modules may be stored in one or more of the memory/media devices. For example, a basic input/output system (BIOS 624), containing the basic routines that help to transfer information between elements within the computing system 600, such as during start-up, may be stored in ROM 608. Similarly, RAM 610, hard drive 618, and/or peripheral memory devices may be used to store computer executable instructions comprising an operating system 626, one or more applications programs 628, other program modules 630, and/or program data 632. Still further, computer-executable instructions may be downloaded to the computing system 600 as needed, for example, via a network connection. The applications programs 628 may include, for example, a maintenance module (e.g., maintenance modules 118, 128, 138).

An end-user may enter commands and information into the computing system 600 through input devices such as a keyboard 634 and/or a pointing device 636. While not illustrated, other input devices may include a microphone, a joystick, a game pad, a scanner, etc. These and other input devices would typically be connected to the processing unit 602 by means of a peripheral interface 638 which, in turn, would be coupled to bus 606. Input devices may be directly or indirectly connected to processing unit 602 via interfaces such as, for example, a parallel port, game port, firewire, or a universal serial bus (USB). To view information from the computing system 600, a monitor 640 or other type of display device may also be connected to bus 606 via an interface, such as via video adapter 642. In addition to the monitor 640, the computing system 600 may also include other peripheral output devices, not shown, such as speakers and printers.

The computing system 600 may also utilize logical connections to one or more computing system environments. Communications between the computing system 600 and the remote computing system environment may be exchanged via a further processing device, such a network router 648, that is responsible for network routing. Communications with the network router 648 may be performed via a network interface component 644. Thus, within such a networked environment (e.g., the Internet, wide area network (WAN), local area network (LAN), etc.) it will be appreciated that program modules depicted relative to the computing system 600, or portions thereof, may be stored in the memory storage device(s) of the computing system 600.

The computing system 600 may also include localization hardware 646 for determining a location of the computing system 600. In embodiments, the localization hardware 646 may include, for example only, a GPS antenna, an RFID chip or reader, a Wi-Fi antenna, or other computing hardware that may be used to capture or transmit signals that may be used to determine the location of the computing system 600.

While this disclosure has described certain embodiments, it is understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, the subject technology is not limited to the specific details set forth herein and can be practiced using one or more other embodiments. In other instances, well known methods, procedures, components, and circuits have not been described in detail as not to unnecessarily obscure various aspects of the present disclosure. Additionally, in one or more embodiments, structures and components are shown in block diagram form to avoid obscuring the concepts of the subject technology.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It is understood, however, that these terms are to be interpreted as referencing physical manipulations and quantities and are merely convenient labels that should be interpreted further in view of terms commonly used in the art.

Unless specifically stated otherwise, as apparent from the discussion herein, it is understood that throughout discussions of the present embodiment, discussions utilizing terms such as "determining", "outputting", "transmitting", "recording", "locating", "storing", "displaying", "receiving", "recognizing", "utilizing", "generating", "providing", "accessing", "checking", "notifying", "delivering", or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or understood to one of ordinary skill in the art.

It is understood that any specific order (e.g., hierarchy) of blocks in the processes disclosed is an illustration of example approaches. Based upon design preferences, it is understood that the specific order (e.g., hierarchy) of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refers to only A, only B, or only C; any combination of A, B, and C; and/or at least one of any of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, one or more implementations, one or more implementations, an embodiment, the embodiment, another embodiment, one or more implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Headings and subheadings, if any, are used for convenience only and do not limit the subject disclosure.

What is claimed is:

1. A computer-implemented method comprising:

accessing, by a computing system, a retention policy and a partitioning strategy for a database, wherein the database includes a control table and a plurality of data tables, and each data table of the plurality of data tables includes one or more data entries;

populating, by the computing system, the control table with control entries based on the retention policy and the partitioning strategy, wherein the populated control entries in the control table represent the plurality of data tables, and each of the populated control entries has a respective retention threshold corresponding to the retention policy;

accessing, by the computing system, a local retention policy and a local partitioning strategy for the database, wherein the local retention policy is different than the retention policy and the local partitioning strategy is different than the partitioning strategy;

updating, by the computing system, the control entries of the control table based on the local retention policy and the local partitioning strategy; and at each predetermined time interval:

purging, by the computing system, data entries from a first data table of the plurality of data tables based on a retention policy of a first control entry of the populated control entries, wherein purging the data entries comprises (i) selecting the first control entry, wherein predetermined time interval of the first data table exceeds the retention threshold of the first control entry, and (ii) removing a data entry from the first data table, wherein the data entry exceeds the retention threshold; and generating, by the computing system, future partitions for a second data table of the plurality of data tables based on a partitioning strategy of a second control entry of the populated control entries, wherein the second data table corresponds to the second control entry.

2. The computer-implemented method of claim 1, wherein each retention threshold represents any one or more of a data size or a data age.

3. The computer-implemented method of claim 1, wherein each of the populated control entries has a respective future partition threshold corresponding to the partitioning strategy.

4. The computer-implemented method of claim 3, wherein generating future partitions for the plurality of data tables comprises:

selecting the second control entry, wherein the second control entry corresponds to a second data table, and the second data table has a number of future partitions below the future partition threshold of the second control entry; and generating a plurality of future partitions for the second data table based on the future partition threshold of the second control entry.

5. The computer-implemented method of claim 1, wherein purging data entries from the data table includes truncating at least part of the data table.

6. The computer-implemented method of claim 1, wherein purging data entries from the data table includes offloading the data entries to an archive database separate from the database.

7. The computer-implemented method of claim 1, further comprising:

at each predetermined time interval:

purging data entries from a third data table of the plurality of data tables based on the local retention policy of a third control entry of the control entries; and generating future partitions for a fourth data table of the plurality of data tables based on the local partitioning strategy of a fourth control entry of the control entries.

8. The computer-implemented method of claim 7, wherein updating the control table based on the local retention policy and the local partitioning strategy comprises prioritizing the local retention policy and local partitioning strategy in one or more of the control entries that were populated based on the retention policy and partitioning strategy.

9. A computing system comprising:

a processor; and a non-transitory computer-readable medium storing instructions that, when executed by the processor, cause the computing system to perform operations comprising:

accessing a data management policy for a database, wherein the database runs on the computing system, the database includes a control table and a plurality of data tables, each data table of the plurality of data tables includes one or more data entries, and the data management policy prescribes a maximum age of data and a minimum number of future partitions for each of the plurality of data tables;

populating the control table with control entries based on the data management policy, wherein the control entries represent the plurality of data tables, and the data management policy includes a retention threshold;

accessing a local data management policy different than the data management policy;

updating the control entries of the control table based on the local data management policy; and triggering, based on a predetermined schedule, an automation package comprising:

purging data entries from a first data table of the plurality of data tables based on the data management policy of a first control entry of the control entries, wherein purging the data entries comprises removing one or more data entries from the first data table that exceed the retention threshold of the first control entry; and generating future partitions for a second data table of the plurality of data tables based on the data management policy of a second control entry of the control entries, wherein the second data table corresponds to the second control entry.

10. The computing system of claim 9, wherein the retention threshold represents any one or more of a data size or a data age.

11. The computing system of claim 9, wherein the data management policy of the second control entry includes a future partition threshold.

12. The computing system of claim 11, wherein generating future partitions for the second data table comprises generating a plurality of future partitions for the second data table such that the future partitions of the second data table exceed the future partition threshold of the second control entry.

13. The computing system of claim 9, wherein purging data entries from the first data table includes truncating at least part of the first data table.

14. The computing system of claim 9, the operations further comprising:

triggering, based on the predetermined schedule, the automation package comprising:

purging data entries from a third data table of the plurality of data tables based on the data management policy of a third control entry of the control entries, wherein the third data table corresponds to the third control entry; and generating future partitions for a fourth data table of the plurality of data tables based on the data management policy of a fourth control entry of the control entries, wherein the fourth data table corresponds to the fourth control entry.

15. The computing system of claim 14, wherein updating the control table based on the local data management policy comprises overwriting the data management policy of one or more of the control entries.

16. A non-transitory computer-readable medium storing instructions that, when executed by a processor of a computing system, cause the computing system to perform operations comprising:

accessing a first data management policy for a database, wherein the database runs on the computing system and includes a plurality of data tables, each data table of the plurality of data tables includes one or more data entries, and the first data management policy prescribes a first maximum age of data and a first minimum number of future partitions for each of the plurality of data tables;

accessing a second data management policy for the database, wherein the second data management policy prescribes a second maximum age of data and a second minimum number of future partitions for one or more data tables of the plurality of data tables;

populating a control table with control entries based on the first data management policy, wherein the populated control entries represent the plurality of data tables, and a populated data management policy of a first control entry includes a retention threshold;

updating the control entries of the control table based on the second data management policy; and triggering, based on a predetermined schedule, an automation package comprising:

purging data entries from a first data table of the plurality of data tables based on the populated data management policy of the first control entry of the control entries, wherein purging the data entries comprises removing one or more data entries from the first data table that exceed the retention threshold of the first control entry; and generating future partitions for a second data table of the plurality of data tables based on the populated data management policy of a second control entry of the control entries, wherein the second data table corresponds to the second control entry.

17. The non-transitory computer-readable medium of claim 16, wherein the second maximum age of data is greater than the first maximum age of data, and the second minimum number of future partitions is greater than the first minimum number of future partitions.

* * * * *